United States Patent Office 3,330,827
Patented July 11, 1967

3,330,827
2-GUANIDINOALKYL-1,4 BENZOXAZINES
Joachim Augstein and Alastair M. Monro, Canterbury, and Geoffrey W. H. Potter, Ramsgate, England, assignors to Chas. Pfizer & Co., Inc., New York, N.Y., a corporation of Delaware
No Drawing. Filed Dec. 14, 1965, Ser. No. 513,834
Claims priority, application Great Britain, Dec. 18, 1964, 51,544/64
10 Claims. (Cl. 260—244)

This invention relates to new and useful organic compounds in the field of medicinal chemistry. More particularly, it is concerned with certain novel heterocyclic compounds which have been found to be useful as therapeutic agents in view of the interesting biological properties which they possess.

The compounds which are included within the purview of the present invention are selected from the class of organic bases of the following general structural formula:

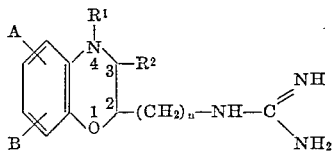

and the mineral and organic acid addition salts thereof, wherein A and B each represent a member selected from the group consisting of hydrogen, chlorine, bromine, and alkyl and alkoxy containing up to four carbon atoms; $n$ is an integer of from one to four; and $R^1$ and $R^2$ each represent a member selected from the group consisting of hydrogen and alkyl having from one to four carbon atoms. Typical member compounds of this series include such 2-guanidinoalkyl-1,4-benzoxazines as 2-guanidinomethyl - 2,3 - dihydro - 4H-1,4-benzoxazine, 2-guanidinomethyl - 6,7 - dichloro - 2,3 - dihydro - 4H - 1,4 - benzoxazine, 2-(3-guanidinopropyl)-2,3-dihydro-4H-1,4-benzoxazine and 2-guanidinomethyl-3-methyl-2,3-dihydro-4H-1,4-benzoxazine, etc. The compounds of this class are of value in the treatment of hypertension.

The process employed for preparing the novel compounds of this invention involves treating an appropriately substituted 2-aminoalkyl-2,3-dihydro-4H-1,4-benzoxazine compound with a guanidine-forming reagent in the manner hereinafter indicated, viz., (1) by reacting a 2-aminoalkyl-2,3-dihydro-4H-1,4-benzoxazine salt, such as the hydrochloride, with cyanamide, or by fusion reaction of said amine salt with dicyanamide to form the corresponding 2-guanidinoalkyl-2,3-dihydro-4H-1,4-benzoxazine salt; (2) by reacting the 2-aminoalkyl-2,3-dihydro-4H-1,4-benzoxazine base compound with a lower S-alkyl isothiouronium salt, such as S-methyl isothiouronium sulfate; (3) by reacting said amine base compound with a salt of 3,5-dimethyl-1-guanylpyrazole to also form the corresponding 2 - guanidinoalkyl - 2,3-dihydro-4H-1,4-benzoxazine salt, and (4) by reacting said amine base with a cyanogen halide like cyanogen bromide, followed by treatment of the resulting intermediate N-cyano compound with ammonia to form the corresponding 2-guanidinoalkyl-2,3-dihydro-4H,1,4-benzoxazine base compound.

The starting materials necessary for the above reaction methods leading to the desired guanidino compounds are either all known compounds or else they can easily be prepared by those skilled in the art in accordance with standard organic procedures. For instance, the precursor amines required for conversion to those guanidine compounds of the present invention where $n=1$ can be obtained by reduction of the corresponding carboxylic acid amides, using lithium aluminum hydride as the preferred reagent for these purposes. The latter compounds, in turn, i.e., the aforementioned carboxylic acid amides, are obtainable by a two-step reaction sequence starting from the appropriate o-aminophenol, which is then condensed with the proper $\alpha,\beta$-dihalopropionate ester compound, such as ethyl 2,3-dibromopropionate, to yield the corresponding intermediate 2 - carbalkoxy - 2,3-dihydro-4H-1,4-benzoxazines; the latter can be subsequently treated with ammonia to yield the desired amides. The precursor amines, on the other hand, for conversion to the corresponding guanidino compounds where $n=2$ or more can be obtained by simply subjecting the aforementioned carboxylic acid esters to known classical methods for ascending the homologous series, e.g.,

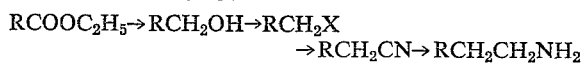

wherein X is halogen.

The preferred method employed for preparing the novel compounds of this invention involves treating an appropriately substituted 2-aminoalkyl-2,3-dihydro-4H-1,4-benzoxazine compound with a lower S-alkyl isothiouronium salt. This particular reaction is normally conducted in a reaction-inert polar solvent medium at a temperature ranging from about 20° C. up to about 120° C. for a period of about four to about 72 hours, and most conveniently at a temperature ranging from about 60° C. to about 100° C. for from about one to twenty hours. In practice, it is generally most convenient to heat the two reactants together under reflux in the polar solvent, employing substantially equimolar amounts of starting materials for this purpose, although a slight excess of one or the other is not harmful in this respect. The desired S-alkyl isothiouronium salt reagent, of course, is preferably one where the S-alkyl group is lower alkyl in view of relative ease with which such a reaction takes place due to the more volatile nature of the by-products produced, i.e., the lower boiling mercaptans. Preferred reaction-inert polar solvents for use in this connection include water, the lower alkanols, such as methanol, ethanol and isopropanol, etc., and the N,N-di(lower alkyl)alkanoamides such as N,N-dimethylformamide, N,N-dimethylacetamide, N,N-diethylformamide, N,N-diethylacetamide, N,N-di(n-propyl)formamide, N,N-dimethylpropionamide, and so forth, as well as the lower dialkyl sulfoxides and sulfones, such as dimethyl sulfoxide, diethyl sulfone, di-isopropyl sulfoxide and di-n-propylsulfone, etc., and mixtures of either of these two aforementioned type organic solvents with water.

Upon completion of the reaction, the solvent is removed by means of conventional procedures and the resulting residue taken up in a suitable solvent system, such as one of the aforementioned types, from which it can be subsequently crystallized. Alternatively, the product may separate first from the reaction mixture either during the course of the reaction or immediately thereafter, or it may be crystallized from the reaction solution after partial initial concentration of same. A final conversion step to the desired organic base compound can then be effected by simply treating the 2-guanidinoalkyl-2,3-dihydro-4H-1,4-benzoxazine acid addition salt thus obtained with sufficient base in water to neautralize same, e.g., an alkaline reagent such as sodium hydroxide in water can be used. Recovery of the desired free organic base can then be had by extracting the aforesaid aqueous solution with a suitable water-immiscible organic solvent of low volatility, such as a halogenated aliphatic hydrocarbon solvent like methylene chloride, for example.

Of the remaining alternate routes previously discussed in a brief manner, the most preferred one is the previously mentioned method involving the reaction of a 2-aminoalkyl-2,3-dihydro-4H-1,4-benzoxazine compound, such as 2-aminomethyl-2,3-dihydro-4H-1,4-benzoxazine, with a salt of a guanylpyrazole base to form the corresponding 2-guanidinoalkyl-2,3-dihydro-4H-1,4-benzoxazine salt direct. The preferred reagent here is a salt of 3,5-dimethyl-1-guanylpyrazole, such as the corresponding sulfate, but it is also possible to employ other lower 3,5-dialkyl-1-guanylpyrazole salts in place of 3,5-dimethyl-1-guanylpyrazole sulfate and achieve equally satisfactory results as well. This particular process is generally carried out by heating the two reactants together in an aqueous medium of the type previously discussed for the S-alkyl isothiouronium method in the absence of any other reagent. Recovery of the desired product from the reaction mixture is then easily effected by evaporation of same under reduced pressure, followed by the subsequent crystallization of the resultant residue from either water or from an aqueous alcohol mixture.

Inasmuch as most of the products obtained from the foregoing guanidine-forming reactions of this invention are already in the form of their salts, the free guanidine base compounds thereof can easily be obtained thereafter by simply treating said salts with a suitably strong alkaline base reagent, such as sodium hydroxide. The free base compounds can then be isolated from the aqueous alkaline medium by means of extraction into a suitable water-immiscible organic solvent phase, preferably employing one of the lower boiling solvents such as a halogenated aliphatic hydrocarbon solvent, like methylene chloride.

Insofar as the 2-guanidinoalkyl-2,3-dihydro-4H-1,4-benzoxazine compounds of this invention are basic compounds, they are capable of forming a wide variety of salts with various mineral and organic acids. Although such salts must be pharmaceutically acceptable for administration to animals, it is possible to first isolate the desired 2-guanidinoalkyl-2,3-dihydro-4H-1,4-benzoxazine compound from the reaction mixture as a pharmaceutically unacceptable salt and then to subsequently convert the latter, as indicated previously, to the free base by treatment with an alkaline reagent, followed by the final conversion to the pharmaceutically acceptable acid salt in the manner hereinafter indicated. For instance, the acid addition salts of the 2-guanidinoalkyl-2,3-dihydro-4H-1,4-benzoxazine base compounds of this invention may be prepared by treating the base compound with a substantially equimolar amount of the chosen acid. The salt-formation step can be carried out in an aqueous solution or in a suitable organic solvent such as methanol or ethanol. Upon careful evaporation of the solvent, the solid salt is obtained.

The acids which are used to prepare the pharmaceutically acceptable acid addition salts of the aforementioned 2-guanidinoalkyl-2,3-dihydro-4H-1,4-benzoxazine bases of this invention are those which form non-toxic acid addition salts containing pharmaceutically acceptable anions, such as the hydrochloride, hydrobromide, hydriodide, nitrate, sulfate or bisulfate, phosphate or acid phosphate, acetate, lactate, citrate or acid citrate, tartrate or bitartrate, oxalate, succinate, maleate, gluconate, saccharate, methanesulfonate, ethanesulfonate, benzenesulfonate and p-toluenesulfonate salts.

As previously indicated, the 2-guanidinoalkyl-2,3-dihydro-4H-1,4-benzoxazine compounds of this invention are therapeutically useful as antihypertensive agents, in which capacity, incidentally, they are especially active. This is due to their ability to lower the blood pressure of correspondingly hypertensive subjects to a statistically significant degree. For instance, 2-guanidinomethyl-2,3-dihydro-4H-1,4-benzoxazine sulfate, a typical and preferred agent of the present invention, has been found to lower the blood pressure of conscious hypertensive rats and anaesthetized dogs to a statistically significant degree via the oral route of administration at a level of 10 mg./kg., without causing any unwanted side effects to occur event when so administered to them for a period of several days (e.g., six days in the case of rats). Further, the herein described compounds can be administered to a hypertensive subject as antihypertensive agents by either the oral or parenteral routes. In general, these compounds are ordinarily administered in dosages ranging from about 0.15 mg. to about 4.8 mg. per kg. of body weight per day, although variations will necessarily occur depending upon the weight of the subject being treated and the particular route of administration chosen.

In connection with the use of the 2-guanidinoalkyl-2,3-dihydro-4H-1,4-benzoxazine compounds of this invention for the treatment of hypertensive subjects, it is to be noted that they may be administered either alone or in combination with pharmaceutically acceptable carriers by either of the routes previously indicated, and that such administration can be carried out in both single and multiple dosages. More particularly, the novel compounds of this invention can be administered in wide variety of different dosage forms, i.e., they may be combined with various pharmaceutically acceptable inert carriers in the form of tablets, capsules, lozenges, troches, hard candies, powders, sprays, aqueous suspensions, injectable solutions, elixirs, syrups, and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucros, gelatin and acacia. Additionally, lubricating agents such as magnesium stearate, sodium lauryl sulfate and talc are often very useful for tableting purposes. Solid compositions of a similar type may also be employed as fillers in soft and hard-filled gelatin capsules; preferred materials in this connection would also include lactose or milk sugar as well as high molecular weight polyethylene glycols. When aqueous suspensions and/or elixirs are desired for oral administration, the essential active ingredient therein may be combined with various sweetening or flavoring agents, coloring matter or dyes and, if so desired, emulsifying and/or suspending agents as well, together with such diluents as water, ethanol, propylene glycol, glycerin and various like combinations thereof.

For purposes of parenteral administration, solutions of these particular 2-guanidinoalkyl - 2,3 - dihydro-4H-1,4-benzoxazines in sesame or peanut oil or in aqueous-propylene glycol or N,N-dimethylformamide may be employed, as well as sterile aqueous solutions of the corresponding water-soluble, non-toxic mineral and organic acid addition salts previously enumerated. Such aqueous solutions should be suitably buffered if necessary and the liquid diluent first rendered isotonic with sufficient saline or glucose. These particular aqueous solutions are especially suitable for intravenous, intramuscular, subcutaneous and intraperitoneal injection purposes. In this connection, the sterile aqueous media employed are readily obtained by standard techniques well-known to those skilled in the art. Needless to say, the necessary steps should be taken throughout the preparation of these injectable solutions to ensure that the final products are also obtained in a sterile condition.

This invention is still further illustrated by the following examples, which are not to be construed in any way or manner as imposing limitations upon the scope thereof.

On the contrary, it is to be clearly understood that resort may be had to various other embodiments, modifications and equivalents thereof which readily suggest themselves to those skilled in the art without departing from the spirit of the present invention and/or the scope of the appended claims.

Example I

A mixture consisting of 4.5 g. (0.0275 mole) of 2-aminomethyl-2,3-dihydro-4H-1,4-benzoxazine and 5.1 g. (0.0136 mole) of 1-guanyl-3,5-dimethylpyrazole sulfate in 100 ml. of water was heated on a steam bath for two hours. At the end of this time, the mixture was cooled to room temperature and extracted with diethyl ether to remove 3,5-dimethylpyrazole. After adding 13.7 ml. of 2 N sulfuric acid to the resulting aqueous phase, the mixture was then allowed to stand overnight (~16 hours) at 4° C. The off-white platelets which separated were subsequently collected by means of suction filtration and recrystallized once from water to afford 4.9 g. of pure 2-guanidinomethyl-2,3-dihydro-4H-1,4-benzoxazine sulfate, M.P. 225–227° C.

*Analysis.*—Calcd. for $C_{10}H_{16}N_4O_5S$: C, 39.47; H, 5.30; N, 18.42; S, 10.52. Found: C, 39.42; H, 5.03; N, 18.48; S, 10.61.

Example II

The procedure described in Example I is repeated employing 2-aminomethyl-6,7-dichloro-2,3-dihydro-4H-1,4-benzoxazine in place of 2-aminomethyl-2,3-dihydro-4H-1,4-benzoxazine on the same molar basis as before. In this particular case, the corresponding product obtained is 2-guanidinomethyl-6,7-dichloro-2,3-dihydro-4H-1,4-benzoxazine sulfate.

In like manner, the use of 2-(2-aminoethyl)-5,8-dibromo-2,3-dihydro-4H-1,4-benzoxazine as starting material in this reaction affords 2-(2-guanidinoethyl)-5,8-dibromo-2,3-dihydro-4H-1,4-benzoxazine sulfate as the final product which is obtained.

Example III

The procedure described in Example III is repeated again on the same molar basis as before except that 2-(2-aminoethyl)-6,7-dimethoxy-2,3-dihydro-4H-1,4-benzoxazine is the starting material employed in place of 2-aminomethyl-2,3-dihydro-4H-1,4-benzoxazine. In this particular case, the corresponding product obtained is 2-(2-guanidinoethyl)-6,7-dimethoxy-2,3-dihydro-4H-1,4-benzoxazine sulfate.

In like manner, the use of 2-aminomethyl-5,8-diisopropoxy-2,3-dihydro-4H-1,4-benzoxazine as starting material in this reaction affords 2-guanidinomethyl-5,8-diisopropoxy-2,3-dihydro-4H-1,4-benzoxazine sulfate as the final product which is obtained.

Example IV

The procedure described in Example I is repeated with 2-(4-aminobutyl)-2,3-dihydro-4H-1,4-benzoxazine as the starting material of choice in place of the corresponding methyl compound, using the same molar proportions as before. The particular product obtained in this case is 2-(4-guanidinobutyl)-2,3-dihydro-4H-1,4-benzoxazine sulfate.

In like manner, the use of 2-(3-aminopropyl)-2,3-dihydro-4H-1,4-benzoxazine as starting material in this reaction affords 2-(3-guanidinopropyl)-2,3-dihydro-4H-1,4-benzoxazine sulfate as the final product which is obtained.

Example V

The procedure described in Example I is repeated with 2-(2-aminoethyl)-3-methyl-2,3-dihydro-4H-1,4-benzoxazine as the starting material in place of the 2-aminomethyl-2,3-dihydro-4H-1,4-benzoxazine compound used before, but still maintaining the same molar proportions. In this particular case, the corresponding product obtained is 2-(2-guanidinoethyl)-3-methyl-2,3-dihydro-4H-1,4-benzoxazine sulfate.

In like manner, the use of 2-aminomethyl-4-ethyl-2,3-dihydro-4H-1,4-benzoxazine as starting material in this reaction affords 2-guanidinomethyl-4-ethyl-2,3-dihydro-4H-1,4-benzoxazine sulfate as the final product which is obtained.

Example VI

A mixture consisting of 3.3 g. (0.02 mole) of 2-(2-aminomethyl)-2,3-dihydro-4H-1,4-benzoxazine and 5.6 g. (0.02 mole) of S-methyl isothiouronium sulfate is heated under reflux in 50% aqueous ethanol for five hours. The reaction mixture is then cooled to room temperature (~25° C.) and the precipitated sulfate salt formed from the unreacted excess amine is subsequently removed by means of suction filtration. Upon prolonged cooling of the resulting aqueous filtrate, there is obtained 2-guanidinomethyl-2,3-dihydro-4H-1,4-benzoxazine sulfate in the form of a crystalline deposit.

Example VII

Ten parts by weight of 2-guanidinomethyl-2,3-dihydro-4H-1,4-benzoxazine sulfate in 50 parts by volume of water is neutralized with 10 N sodium hydroxide solution. Extraction of the resulting aqueous solution with several portions of methylene chloride, followed by separation of the organic layer and its subsequent concentration under reduced pressure then affords 2-guanidinomethyl-2,3-dihydro-4H-1,4-benzoxazine as a free base.

In like manner, when each of the other 2-guanidinoalkyl-2,3-dihydro-4H-1,4-benzoxazine salts of this invention, like the sulfate salts reported in Examples II–VI, are each individually subjected to this same reaction procedure, the corresponding free organic base compound is always the product obtained.

Example VIII

The following 2-guanidinoalkyl-2,3-dihydro-4H-1,4-benzoxazines can be prepared according to the procedures described in the previous examples from the appropriate starting compounds:

| A | B | $R^1$ | $R^2$ | n |
|---|---|---|---|---|
| H | H | $CH_3$ | H | 2 |
| 6-$OC_2H_5$ | 7-$OC_2H_5$ | H | H | 4 |
| 6-Cl | 7-Cl | H | n-$C_3H_7$ | 1 |
| 6-Br | 7-Br | H | H | 3 |
| H | H | H | H | 2 |
| 5-$CH_3$ | 8-$CH_3$ | n-$C_4H_9$ | H | 2 |
| 6-$OCH_3$ | 7-$OCH_3$ | $C_2H_5$ | H | 4 |
| 5-Cl | 8-Cl | H | $CH_3$ | 1 |
| 5-Cl | 8-Cl | H | H | 2 |
| 6-Br | 7-Br | $CH_3$ | H | 3 |
| H | H | H | $C_2H_5$ | 4 |
| 6-Cl | 7-Cl | H | H | 4 |
| 6-$C_2H_5$ | 7-$C_2H_5$ | H | H | 1 |
| 5-$OC_2H_5$ | 8-$OC_2H_5$ | H | $C_2H_5$ | 2 |
| 6-$OCH_3$ | 7-$OCH_3$ | H | H | 4 |
| 6-Cl | 7-Cl | n-$C_3H_7$ | H | 1 |
| 5-Br | 8-Br | H | $CH_3$ | 2 |
| 5-(n-$C_4H_9$) | 8-(n-$C_4H_9$) | H | H | 3 |
| 6-$OC_2H_5$ | 7-$OC_2H_5$ | $CH_3$ | H | 4 |
| H | H | H | $CH_3$ | 1 |
| 6-Cl | 7-Cl | H | iso-$C_3H_7$ | 3 |
| 6-Br | 7-Br | H | H | 1 |
| 6-$CH_3$ | 7-$CH_3$ | H | $CH_3$ | 4 |
| 6-$OCH_3$ | 7-$OCH_3$ | $C_2H_5$ | H | 3 |
| 5-Cl | 8-Cl | $CH_3$ | H | 2 |
| H | H | H | n-$C_4H_9$ | 4 |
| 5-$CH_3$ | 8-$CH_3$ | H | H | 1 |
| 5-(n-$C_4H_9$) | 8-(n-$C_4H_9$) | H | H | 1 |

Example IX

The non-toxic hydrohalide acid addition salts of each of the 2 - guanidinoalkyl - 2,3 - dihydro- 4H - 1,4-benzoxazine bases reported previously in Examples VII–VIII, such as the hydrochloride, hydrobromide and hydriodide salts thereof, are each individually prepared by first dissolving the respective organic base compound in absolute ether followed by introduction of the appropriate hydrogen halide gas into the reaction solution until saturation of same is complete with respect to said gas, whereupon the desired salt precipitates from solution. The crystalline product so obtained is then recrystallized from acetone-ether to yield the pure hydrohalide salt. For instance, when 1.0 g. of 2 - guanidinomethyl - 2,3 - dihydro-4H-1,4-benzoxazine is dissolved in anhydrous diethyl ether and dry hydrogen chloride gas is subsequently passed into the resulting solution until saturation of same is complete with respect to said gas, there is obtained a crystalline precipitate of 2 - guanidinomethyl-2,3-dihydro-4H-1,4-benzoxazine hydrochloride.

Example X

The nitrate, sulfate or bisulfate (other than those previously recorded), phosphate or acid phosphate, acetate, lactate, citrate or acid citrate, tartrate or bitartrate, oxalate, succinate, maleate, gluconate, saccharate, methanesulfonate, ethanesulfonate, benzenesulfonate and p-toluenesulfonate salts of each of the 2-guanidinoalkyl-2,3-dihydro-4H-1,4-benzoxazine bases previously reported in Examples VII–VIII are all prepared by separately dissolving in a suitable amount of ethanol the proper molar amounts of the respective acid and the appropriate organic base compound and then mixing the two solutions together, followed by the addition of diethyl ether to the resulting reaction solution in order to effect precipitation of the desired acid addition salt therefrom. For instance, when equimolar amounts of 2 - guanidinomethyl - 6,7-dichloro - 2,3 - dihydro - 4H - 1,4 - benzoxazine and concentrated sulfuric acid react in accordance with this procedure, the corresponding product obtained is 2-guanidinomethyl - 6,7 - dichloro - 2,3 - dihydro - 4H-1,4-benzoxazine sulfate. In like manner, each of the other salts are similarly prepared.

What is claimed is:
1. a compound selected from the group consisting of 2-guanidinoalkyl-1,4-benzoxazines of the formula:

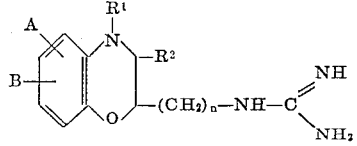

and the pharmaceutically acceptable acid addition salts thereof, wherein A and B each represent a member selected from the group consisting of hydrogen, chlorine, bromine, and alkyl and alkoxy containing up to four carbon atoms; $n$ is an integer of from one to four; and $R^1$ and $R^2$ each represent a member selected from the group consisting of hydrogen and alkyl having from one to four carbon atoms.

2. A compound as claimed in claim 1 wherein A, B, $R^1$ and $R^2$ are each hydrogen, and $n$ is an integer of from one to four.

3. A compound as claimed in claim 1 wherein A and B are each chlorine, $R^1$ and $R^2$ are each hydrogen, and $n$ is an integer of from one to four.

4. A compound as claimed in claim 1 wherein A, B and $R^1$ are each hydrogen, $R^2$ is alkyl having from one to four carbon atoms, and $n$ is an integer of from one to four.

5. A compound as claimed in claim 1 wherein A and B are each alkoxy, $R^1$ and $R^2$ are each hydrogen, and $n$ is an integer of from one to four.

6. The compound of claim 2 wherein $n$ is one.

7. The compound of claim 2 wherein $n$ is three.

8. The compound of claim 3 wherein $n$ is one.

9. A compound as claimed in claim 1 wherein A, B and $R^1$ are each hydrogen, $R^2$ is methyl and $n$ is one.

10. A compound as claimed in claim 1 wherein A and B are each methoxy, $R^1$ and $R^2$ are each hydrogen, and $n$ is one.

References Cited
UNITED STATES PATENTS 3,058,980  10/1962  Berg _____ 260—244

WALTER A. MODANCE, *Primary Examiner.*
ROBERT T. BOND, *Assistant Examiner.*